United States Patent Office 3,692,629
Patented Sept. 19, 1972

3,692,629
OXIDATION OF STEROIDS
Ewart Ray Herbert Jones and George Denis Meakins, Oxford, and Andrew Samuel Clegg, Mexborough, England, assignors to Glaxo Laboratories Limited, Greenford, England
No Drawing. Filed Apr. 5, 1971, Ser. No. 131,432
Claims priority, application Great Britain, Apr. 6, 1970, 16,255/70
Int. Cl. C07c 167/08
U.S. Cl. 195—51 R                         27 Claims

ABSTRACT OF THE DISCLOSURE

Process for the microbiological $1\beta,11\alpha$-bis-hydroxylation of ring A- and C-saturated $5\alpha$- and 5(6)-dehydropregnan-20-ones wherein the steroid substrate is incubated with one of the microorganisms *Aspergillus ochraceus*, *Aspergillus nidulans*, *Rhizopus arrhizus*, *Corticium praticola* or *Polystictus sanguineus* and recovering the bishydroxylated product.

---

This invention relates to a novel process for the microbiological hydroxylation of steroids.

In the field of steroid synthesis it has frequently been found useful to introduce an oxygen function at a previously unsubstituted carbon atom by microbiological hydroxylation, that is by providing the steroid as a substrate for a selected bacterial or fungal organism and recovering the hydroxylated steroid product produced metabolically by the organism. Most positions of the steroid nucleus can be hydroxylated in this way.

In general, the steroid substrates for such hydroxylations have possessed unsaturation in ring A, most commonly a 4,5-double bond. This has particularly been true where *Aspergillus ochraceus* and other organisms have been used to introduce an $11\alpha$-hydroxy substituent.

Although it is sometimes found that a microorganism will introduce two hydroxy groups into the steroid substrate, it is generally found that the first hydroxy group introduced will sterically hinder the introduction of a second hydroxy group into a conformationally close position. In particular, even where an $11\alpha$-hydroxylating organism is found to produce some $1\beta$-hydroxylation of a 4,5-dehydrosteroid substrate, steric competition of the $1\beta$-hydroxyl with the $11\alpha$-hydroxyl prevents any $1\beta$, $11\alpha$-dihydroxylation (V. Schwarz et al.; Steroids, 1964, 4, page 645).

We have now found that when ring A- and C-saturated $5\alpha$- and 5(6)-dehydro-pregnan-20-ones and carbonyl derivatives of such compounds, e.g. 20-ketals, are used as substrate, certain organisms known to introduce an $11\alpha$-hydroxy group will introduce not only this group but a further hydroxyl group in the $1\beta$-position. As far as we are aware from the literature, bis-hydroxylations of this type, in which two such closely spaced hydroxy groups are introduced, are most unusual and no such processes have been described.

According to the present invention there is provided a process for the microbiological $1\beta,11\alpha$-bishydroxylation of ring A- and C-saturated $5\alpha$- and 5(6)-dehydropregnan-20-ones possessing at the 16- and $17\alpha$-positions hydrogen atoms or one only of the following groupings, namely a $17\alpha$-hydroxy group, a $17\alpha$-acyloxy group, a 16-aliphatic group, a 16,17-epoxy group or a 16,17-double bond, which comprises incubating the steroid substrate with one of the microorganisms *Aspergillus ochraceus*, *Aspergillus nidulans* or *Rhizopus arrhizus* and recovering the bishydroxylated product. The invention further provides a modification of this process, wherein the steroid substrate is incubated with one of the microorganisms *Corticium praticola* or *Polystictus sanguineus*.

The provision of a $1\beta$-hydroxyl group in a ring A-saturated steroid enables a 1,2-double bond to be introduced subsequently by dehydration and thus provides a route to physiologically active 11-oxygenated 1,2-dehydro-steroids such as $11\alpha$-hydroxy-$5\alpha$-pregn-1-ene-3,20-dione which has been described in U.S. Pat. 2,788,353 as possessing therapeutic hormonal activity, especially of the type characterising the adrenal-corticoid steroids. In addition, 3-ketones prepared in this way can be subjected to ring A-dehydrogenation to produce the 3-oxo-$\Delta^{1,4}$-structure which is present in a large number of physiologically active steroids. Thus, for example, $1\beta,11\alpha$-dihydroxy-$5\alpha$-pregnane-3,20-dione may be converted by steps involving ring A- dehydrogenation and dehydration into $11\alpha$-hydroxypregna-1,4-diene-3,20-dione oxidation of which leads to pregna-1,4-diene-3,11,20-trione, described in U.S. Pat. 2,883,400 as having valuable glucocorticoid and anti-inflammatory activity. The above dehydrogenation can also, in some cases, be made to yield 4,16-diene-3,20-dione, which on dehydration at the 1-position yield 1,4,6-triene-3,20-diones which are also reported in U.S. Pat. 2,788,353 as possessing adrenal-corticoid activity.

As indicated above, the steroids which may be used in the process according to the invention comprise $5\alpha$- and 5(6)-dehydro-pregnan-20-ones, the $5\alpha$-pregnan-20-ones being preferred substrates for the purposes of this process. These 20-ones may also be used as carbonyl derivatives, for example as 20-ketals such as ethylene ketals.

The steroids may carry various substituents. Thus the 3-position preferably carries an oxygen function, for example, a hydroxy or esterified hydroxy group or a keto group. Esterified hydroxy groups include, for example, acyloxy groups, e.g. lower aliphatic, araliphatic or aromatic acyloxy groups, preferably having 1–6 carbon atoms in any aliphatic moieties and any aromatic groups being preferably monocyclic; acetoxy, propionyloxy, phenylacetoxy or benzoyloxy groups may thus be present.

If the steroid carries a 16-aliphatic substituent this may be in the $\alpha$- or $\beta$-configuration, the $\beta$-configuration being preferred. The aliphatic group may be, for example, an alkyl group, preferably one having 1–6 carbon atoms, e.g. a methyl group.

$17\alpha$-hydroxy groups are preferably present in the form of $17\alpha$-acyloxy groups; these acyloxy groups may be any of those listed above as possible 3-acyloxy groups.

The microbiological hydroxylation is preferably carried out by culturing the hydroxylating organism on or in a nutrient medium therefor, adding the steroid substrate to be hydroxylated and eventually recovering the bishydroxylated product, although it is also possible to contact the steroid substrate with separated and washed mycelium or spores. The nutrient medium will contain a source of nitrogen, a source of carbon and energy, co-factors and trace elements. The nitrogen source may, for example, be a material of organic origin such as corn steep liquor, malt, soybean meal, beef extract, yeast extract, lactalbumin, casein, peptone, or protein hydrolysates, or a synthetic material such as a nitrate or ammonium salt. The source of carbon and energy may, for example, be a carbohydrate, e.g. glucose, maltose, mannose, dextrose, lactose, sucrose, molasses, glycerol, mannitol or starch.

Trace elements and co-factors will be present in most nutrients of natural origin but may have to be added where synthetic media are employed.

The microorganisms may be in a state of growth or may be dormant, and either spores or mycelium may be used. Particularly useful strains of *A. ochraceus* include Wilhelm (CBS 132.52), NRRL 398, IMI 16264 and NRRL 405. The preferred *A. nidulans* is ATCC 11267.

The preferred strain of *R. arrhizus* is CBS 285.55; that of *C. praticola* is Kotila, CBS 340.51; and that of *P. sanguineus* is (L. ex Fr.) Mey (*Pycnoporus sanguineus* (L. ex Fr.) Murrill) CBS 358.63.

The pH of the medium is preferably optimal for growth of the organism, usually in the range 4.0 to 7.0. For *A. ochraceus*, the preferred pH is about 5.5.

It is advantageous to add to the culture medium a solvent for the steroid substrate, although it is also possible to obtain efficient metabolism of the steroid by using it in microfine form. The most preferred solvent is dimethyl sulphoxide, but other dialkyl sulphoxides may be used, as well as alkanols such as methanol and ethanol, substituted amide solvents such as dimethylformamide or dimethylacetamide, ketones such as acetone and methyl ethyl ketone and ethers such as diethyl ether, tetrahydrofuran and dioxan. A wetting agent may also advantageously be present, whether or not a solvent is added. Examples of such agents are Spans (hexitol anhydride esters of long-chain fatty acids), Tweens (polyoxyalkylene ethers of hexitol anhydride long-chain fatty acid esters, preferably having 15-30 oxyethylene units), Nacconols and Ultrawets (alkyl aryl sodium sulfonates), and the like. Tween 80 which has about 20 oxyethylene units and Ultrawet 30-DS which is a $C_{10-12}$ alkylbenzene sodium sulphonate have proved especially suitable. Where dimethyl sulphoxide is used, its concentration in the medium is preferably 0.1-10%, advantageously about 7.5% v./v. and other solvents are advantageously used in the same concentration range.

The concentration of steroid substrate in the medium is preferably in the range 0.01 to 5% by weight, advantageously about 0.01 to 1.0% by weight.

The culture of the organism is preferably effected at its optimal growth temperature which in general will be between 15° and 37° C. The hydroxylation will usually take place in ½ to 8 days, for example 5 to 7 days, 6 days being usual. The course of the conversion can be followed, for example, by thin layer chromatography.

The 1β, 11α-dihydroxy products can be recovered from the medium, for example, by extraction with a water-immiscible organic solvent either in the presence of the microorganism or after separation, e.g. by filtration or centrifugation. In either case, the cells of the microorganism, in order to recover absorbed steroid, are preferably washed with a water-miscible organic solvent such as one of those which may advantageously be added to the culture medium to aid solution of the steroid, e.g. a ketone such as acetone; this solvent may then be evaporated and the residue dissolved in a water-immiscible solvent. The water-immiscible solvent for extraction or for dissolution of the above residue may, for example, be a hydrocarbon or chlorinated hydrocarbon such as benzene, methylene chloride or chloroform, an ether solvent such as diethyl ether, a ketone such as methyl isobutyl ketone or an ester such as ethyl or butyl acetate.

The extracted 1β,11α-dihydroxy steroid so recovered may then advantageously be converted into an alkylenedioxy derivative, e.g. a ketonide, by reaction with a ketone or aldehyde or into an orthoester by reaction with an orthoester reagent, taking advantage of the proximity of the 1β- and 11α-hydroxyl groups.

For formation of an alkylenedioxy derivative, the preferred reagents are aliphatic, araliphatic or aryl aldehydes and ketones, for example acetone, methyl ethyl ketone, acetophenone and benzaldehyde. The orthoester reagent may, for example, be a trialkyl orthoester of a lower alkanoic acid, for example trimehtyl or triethyl orthoformate, triethyl orthoacetate, triethyl orthopropionate, trimethyl orthobutyrate or orthovalerate. An acid catalyst will normally be present, for example, an inorganic acid such as hydrochloric, hydrobromic, perchloric or sulphuric acid or an organic acid such as p-toluene sulphonic acid. In general, acetonides are the preferred derivatives of the dihydroxylated steroid products. Where a further free hydroxyl group is present, for example in the 3-position, reaction with an orthoester reagent may give some acylated material, but the hydroxy and acyloxy compounds may be separated, e.g. by chromatography. The orthoesters contain an asymetric carbon atom, as do the alkylenedioxy derivatives from aldehydes and asymmetric ketones, so that such products will normally be formed initially as mixtures of diastereoisomers. These do not normally require separation since the protecting group will in most cases eventually be removed.

If desired, the alkylenedioxy or orthoester groupings can be removed subsequently by hydrolysis. Acid hydrolysis, e.g. in dilute mineral acid, such as hydrochloric, perchloric or sulphuric acid, will convert an alkylenedioxy derivative back to the diol. Where the alkylenedioxy derivative is a ketonide, perchloric acid in an alkanol, e.g. methanol, is a preferred reagent for effecting the hydrolysis, conveniently at room temperature. Acid hydrolysis of an orthoester will normally yield initially a mono-acyloxy derivative; to regenerate the diol, the acyloxy group may be hydrolysed by further treatment with acid or with a base such as an alkali metal alkoxide in an alkanolic medium. However where a 3-keto group is present, elimination of the group at the 1β-position in the acid hydrolytic medium will yield the corresponding 1,2-dehydro-3-keto steroid.

The 1β, 11α-dihydroxy derivatives can also be esterified for example by reaction with an acylating agent such as an acid anhydride or chloride, e.g. in pyridine, whereby one or both of the two hydroxyl groups may be acylated. Under these conditions, however, a 3-ketone will usually dehydrate to form a $\Delta^1$-steroid.

The dehydration of a 1β,11α-dihydroxy-3-keto steroid to yield the corresponding 1,2-dehydro compound may also be effected without prior formation of an alkylenedioxy or orthoester derivative, simply by heating, preferably in an acid medium, for example a dilute mineral acid such as hydrochloric or sulphuric acid or in a basic medium such as pyridine.

Where a 3β-hydroxy group is present in the initial reaction product and the 1β- and 11α-hydroxy groups have been protected, for example by formation of a ketonide, ester or orthoester, it is possible to produce the corresponding 3-oxo compound by oxidation, e.g. with a chromic acid oxidising reagent, for example in acetone or pyridine solution. An orthoester is preferably oxidised under basic or neutral conditions. Other oxidising agents can be used for oxidation, for example: Oppenauer reagents, that is secondary or tertiary alkoxides in the presence of a ketone, for example aluminium isopropoxide and acetone or potassium t-butoxide and benzophenone; dimethyl sulphoxide (DMSO) reagents, for example DMSO with pyridine-sulphur trioxide complex and triethylamine, DMSO with acetic anhydride, or a carbodiimide, e.g. dicyclohexyl carbodiimide, pyridine and dichloracetic acid in DMSO-benzene; sources of positive halogen, for example N-bromo-amides or imides, isocyanuric halides or tert. butyl hypochlorite; lead tetraacetate in pyridine; or oxygen in the presence of a catalyst, for example a platinum catalyst.

When using a ketone such as acetone as solvent with an acidic oxidising agent, for example chromic acid, 1β,3β, 11α-triol can be used as starting material since the 1β and 11α-hydroxy groups will be protected by rapid ketonide formation.

For the introduction of a 4,5-double bond, a 3-keto 1β, 11α-alkylenedioxy or orthoester derivative may be brominated to introduce an A-ring bromine atom, this being followed by dehydrobromination. Bromination may be effected by molecular bromine in an inert solvent, for example a cyclic ether solvent such as dioxan or tetrahydrofuran, in the presence of a trace of hydrogen bromide. Dehydrobromination is preferably effected using a base having a high dielectric constant, e.g. an N,N-disubstituted amide or N-substituted cyclic amide such as dimethylformamide, dimethylacetamide or N-methylpyrrolidone, in the presence of an alkali or alkaline earth metal carbonate e.g. lithium carbonate or calcium carbonate. Bromination tends to introduce a further bromine atom in the 17α-position, which on dehydrobromination gives a 4,16-diene-3,20-dione. Acid catalysed removal of the alkylenedioxy or orthoester grouping then yields an 11α-hydroxy-1,4-diene-3,20-dione or the corresponding 1,4,16-triene.

The ring A- and C-saturated 1β,11α-dihydroxylated 5α - pregnane-3,20-diones and 3 - hydroxy-5α-pregnan-20-ones possessing a 17α-hydrogen atom or a 17α-hydroxy or 17α-acyloxy group or a 16-aliphatic or 16,17-epoxy group or a 16,17-double bond and the corresponding 5(6)-dehydro derivatives are new compounds and constitute a further feature of the invention. The 1β,11α-alkylenedioxy and orthoester derivatives of these steroids are also new compounds, with the exception of the acetonides. Further new compounds include 1β,11α-alkylenedioxy and orthoester derivatives of 1β,11α-dihydroxypregn-4-ene-3,20-diones and 1β,11α-dihydroxypregna-4,16-diene-3,20-diones.

Specific new compounds according to the invention, which are of use as intermediates as explained herein include:

1β,3β,11α-trihydroxy-5α-pregnan-20-one
1β,11α-dihydroxy-5α-pregnane-3,20-dione
1β,11α-(1'-ethyl-1'-methylmethylenedioxy)-3β-hydroxy-5α-pregnan-20-one
3β-acetoxy-1β,11α-(1'-ethoxy-1'-methylmethylenedioxy)-5α-pregnan-20-one
1β,11α-(1'-ethoxy-1'-methylmethylenedioxy)-3β-hydroxy-5α-pregnan-20-one
1β,11α-(1'-ethoxy-1'-methylmethylenedioxy)-5α-pregnane-3,20-dione
1β,11α-isopropylidenedioxypregn-4-ene-3,20-dione
1β,11α-isopropylidenedioxypregna-4,16-diene-3,20-dione
1β,3β,11α-trihydroxypregn-5-en-20-one
1β,3β,11α-trihydroxy-16α,17α-epoxy-5α-pregnan-20-one and its acetonide
1β,3β,11α-tricydroxy-5α-pregn-16-en-20-one and its acetonide
1β,3β,11α-trihydroxy-16β-methyl-5α-pregnan-20-one and its acetonide.

The following examples are given by way of illustration only; all temperatures are in ° C.; the two figures quoted below for the percentage yields in the hydroxylation step refer respectively to the actual yield and that adjusted for recovered starting material. The mass spectral data were in accordance with the given structures in all cases. "Petrol" refers to the light petroleum fraction boiling in the range 40–60°. All rotations are given in chloroform solution unless otherwise stated. All U.V. spectra were determined in ethanol and I.R. spectra in carbon disulphide unless otherwise stated. Layer chromatography was effected on alumina or silica plates; "t.l.c." refers to thin layer chromatography; "p.l.c." refers to preparative layer chromatography.

EXAMPLE 1

Hydroxylation of 3β-hydroxy-5α-pregnan-20-one with Aspergillus ochraceus

GROWING THE MICROORGANISM

Aspergillus ochraceus, Wilhelm (CBS 132.52) was obtained on agar slopes from the Centraalbureau voor Schimmelcultures, Baarn, Netherlands.

Slopes were prepared from 3% malt extract containing 2% agar in ion-free distilled water. This solution, in 10 ml. portions was poured into test-tubes, which were then sterilised and allowed to set at an angle. These slopes were then inoculated with the organism from the master slopes using a Nichrome needle and developed for 10–15 days at 25°. To ensure a continuous supply of slopes, new ones were prepared from the existing ones 14 days after the appearance of a healthy development.

Nutrient medium of the following composition was prepared in ion-free distilled water:

Malt extract: 1 g./l.
Beef extract (Lab lemco): 1 g./l.
Yeast (Difco): 1 g./l.
Cornsteep liquor: 1 ml./l.
Glucose: 5 g./l.

The pH was adjusted to 5.5 with 2 N-hydrochloric acid and sucrose (2 g./l.) was added. The medium was introduced into 500 ml. conical flasks (200 ml./flask) which were then plugged with cottonwool and sterilised in steam at 10 p.s.i. for 10 minutes. These flasks were then inoculated with a spore suspension from the slopes under sterile conditions in an air-conditioned room in the following manner. Sterile, ion-free distilled water (2–3 ml.) was added to each of the slope tubes to form a layer above the gel, and the mould agitated with a sterile nickel needle to form a spore suspension suitable for inoculating 3–4 flasks of sterilised medium. The inoculating pipette was previously heated over a free flame and allowed to cool and the flask necks were flamed before and after addition in order to reduce the risk of contamination. The flasks were replugged with cottonwool and swirled at 200 r.p.m. at 25° for two days, after which time any not showing a healthy growth were discarded.

ADDITION AND EXTRACTION OF THE STEROID

The substrate 3β-hydroxy-5α-pregnan-20-one, was dissolved in dimethyl sulphoxide (40 mg./15 ml.) and this solution introduced under sterile conditions into the flasks (15 ml./flask) containing the two-day-old organism. The organism and substrate were incubated for six days at 25°, swirling at 200 r.p.m.

The contents of the flasks were then combined, an equal amount of water added and the whole saturated with salt. This solution was then extracted with about one third its volume of methylene chloride using filtration through glass-wool to break up the emulsion formed and to separate the mycelia. The filtrate was then extracted twice more in a similar manner. The mycelia were allowed to stand overnight in acetone and then filtered. This filtrate was concentrated, taken up in chloroform and washed with brine before being combined with the methylene chloride extracts. Evaporation gave a solution of the crude product in dimethyl sulphoxide. This latter was removed by short-path distillation at an oil pump on a steam bath. For small-scale experiments (2 flasks) this procedure was slightly modified; the mycelia and solution were not separated and the dimethyl sulphoxide was washed out by extracting the organic layer twice with brine.

EXAMPLE 2

(a) Hydroxylation of 3β-hydroxy-5α-pregnan-20-one

3β-hydroxy-5α-pregnan-20-one (3.0 g.) was fed to A. ochraceus in the manner described in Example 1. The brown viscous liquid extract was chromatographed on alumina (250 g., 10% deactivated). Elution with petrol-chloroform (2:1) gave a white solid (100 mg., 0.3%) shown to be unchanged starting material. Chloroform eluted an impure solid which was further purified by p.l.c. [preparative layer chromatography: one metre plate developed six times with petrol-acetone (4:1)] to give a crystalline solid, 1β,11α-dihydroxy-5α-pregnane-3, 20-dione (256 mg. 8%, 8%). M.P. 186–196°, $\bar{v}_{max.}$ 3603, 3435, 1717 and 1704 cm.$^{-1}$. Stripping the column with chloroform-methanol (20:1) afforded impure material further resolved by p.l.c. [five metre plates developed six times with petrol-acetone (3:1)] to a white solid which was crystallised from acetone-hexane giving 1β,3β,11α-trihydroxy-5α-pregnan-20-one as needles (1.7 g., 52%, 54%), M.P. 212–215°. $[\alpha]_D^{20} +50°$ (c. 0.5, MeOH) (Found: C, 71.7; H, 9.7. $C_{21}H_{34}O_4$ requires C, 72.0; H, 9.8%) $\bar{v}_{max.}$ (Nujol) 1698 cm.$^{-1}$.

(b) 1β, 11α-isopropylidenedioxy-5α-pregnane-3, 20-dione

1β,3β,11α-trihydroxy-5α-pregnan-20-one (400 mg.) in acetone (15 ml.) was treated dropwise with Jones reagent in the usual manner. Isolation with ether gave a gum which was chromatographed on alumina (50 g., 10% deactivated). Elution with petrol-ether (3:1) afforded a crystalline solid (160 mg. 36%) which was recrystallised from acetonehexane to give the desired acetonide, M.P. 182–183.5°, $[\alpha]_D^{20}+106°$ (c. 0.7) (Found: C, 74.0; H, 9.2 $C_{24}H_{36}O_4$ requires C, 74.2; H, 9.3%), $\bar{v}_{max.}$ 1721 and 1708 cm.$^{-1}$, n.m.r. signals at τ (CDCl$_3$) 9.37 (CH, 18-H), 8.95 (3H, 19-H), 8.71 (3H, acetonide methyl) 8.68 (3H, acetonide methyl), 7.87 (3H, 21-H), 6.17 (J=10,7,1H, 1α-H), 6.00 (J=12,9,6, 1H, 11β-H).

(c) 3β-hydroxy-1β,11α-isopropylidenedioxy-5α-pregnan-20-one

1β,3β,11α-trihydroxy-5α-pregnan-20-one (80 mg.) in acetone (10 ml.) was treated with 2 N-hydrochloric acid (5 drops) and left for 2 hours at room temperature. Extraction with ether gave a solid which was purified on an alumina column (10 g., 10% deactivated). Elution with petrolether (1:1) afforded a white solid (74 mg., 83%) which was crystallised from hexane giving the hydroxy-acetonide as plates. M.P. 166–168°, $[\alpha]_D^{20}+77°$ (c. 0.4) (Found: C, 73.8; H, 9.7. $C_{24}H_{38}O_4$ requires C, 73.8; H, 9.8%), $\bar{v}_{max.}$ 3610 and 1708 cm.$^{-1}$, n.m.r. signals at τ(CDCl$_3$) 9.39 (3H, 18-H), 9.11 (3H, 19-H), 8.69 (6H, acetonide methyls), 7.88 (3H, 21-H), 6.4 (m. 1H, 3α-H), 6.42 (J=12,5,1H, 1α-H), 6.06 (J=11,10,6,1H,11β-H).

EXAMPLE 3

11α-hydroxy-5α-pregn-1-ene-3,20-dione (a) 1β,11α-dihydroxy-5α-pregnane-3,20-dione (40 mg.) was dissolved in pyridine (6 ml.). Acetic anhydride (2 ml.) was added and the solution left for 24 hours at 20°. Water (5 ml.) was added and the solution left for a further 24 hours. Ether extraction gave a gum which was chromatographed on a small plate. The dominant band afforded a crystalline solid (24 mg., 63%) which was crystallised from acetone-hexane to give the title dione as plates, M.P. and mixed M.P. with authentic material (see below) 202–203°, $\bar{v}_{max.}$ 3595, 1707 and 1695 cm.$^{-1}$, n.m.r. signals at τ(CDCl$_3$) 9.32 (3H,18-H), 8.86 (3H, 19-H), 7.86 (3H, 21-H), 5.89 (J=10,10,4, 1H,11β-H), 4.19 (J=10, 1H,2-H), 1.66 (J=10, 1H, 1-H).

(b) 1β,11α-isopropylidenedioxy-5α-pregnane-3,20-dione (100 mg.) in dioxan (16 ml.) and 2 N-hydrochloric acid (4 ml.) was refluxed for 3 hours using an air condenser when t.l.c. (thin layer chromatography) indicated the absence of starting material. Extraction with ether gave a gum which was purified by p.l.c. [one 20 x 20 cm. plate eluted six times with petrol-acetone (6:1)] yielding a white crystalline solid (55 mg., 65%). This was recrystallised from acetone-hexane to give the title dione as plates, M.P. 202–203°, $[\alpha]_D^{20}+44°$ (c. 0.9) (Found: C, 76.1; H, 9.3; calculated for $C_{31}H_{30}O_3$ C, 76.3; H, 9.15%), λ$_{max.}$ 231 nm. (ε 10,000), n.m.r. signals at τ(CDCl$_3$) 9.32 (3H, 18-H), 8.86 (3H, 19-H), 7.87 (3H, 21-H), 5.90 (J=10,10,5, 1H, 11β-H), 4.20 (J=10, 1H, 2-H), 1.66 (J=10,1H,1-H).

EXAMPLE 4

(a) Incubation of 3β-hydroxypregn-5-en-20-one with *A. ochraceus*

3β-hydroxypregn-5-en-20-one (3.0 g.) in DMSO (1110 ml.) was fed to a culture of *A. ochraceus* as in Example 1. Extraction after 6 days gave a solid which was chromatographed on alumina (500 g., 10% deactivated). Elution with chloroform-methanol (95:5) and further purification by p.l.c. [one metre plate eluted once with ether-methanol (98:2)] and crystallisation from acetone-hexane gave 1β,3β,11α-trihydroxypregn-5-en-20-one as needles (250 mg., 7%), M.P. 224–226°, $[\alpha]_D^{20}+8°$ (c. 0.9, ethanol) (Found: C, 73.0; H, 9.4. $C_{21}H_{32}O_4$ requires C, 72.8; H, 9.3%), $\bar{v}_{max.}$ (Nujol) 1711 cm.$^{-1}$.

(b) 3β-hydroxy-1β,11α-isopropylidenedioxy-pregn-5-en-20-one

1β,3β,11α-trihydroxypregn-5-en-20-one (68 mg., crude material, residue from crystallisation) was refluxed in acetone (20 ml.) with p-toluene sulphonic acid (2 mg.). The reaction was followed by t.l.c. and little starting material could be detected after 3 hours when ethyl acetate extraction gave material which was resolved by p.l.c. [one 20 x 20 cm. plate developed twelve times with petrol-acetone (12:1)]. The dominant band afforded product (28 mg.) which was recrystallised from acetone-hexane to give the acetonide as rhomboids, M.P. 245–248°, $[\alpha]_D^{20}-10°$ (c. 0.4) (Found: C, 74.3; H, 9.3. $C_{24}H_{36}O_4$ requires C, 74.2; H, 9.3%), $\bar{v}_{max.}$ 3600 and 1707 cm.$^{-1}$, n.m.r. signals at τ(CDCl$_3$) 9.37 (3H, 18-H), 8.89 (3H, 19-H), 8.68 and 8.66 (acetonide methyls), 7.86 (3H, 21-H), 6.4 (1H, multiplet, 3α-H), 6.38 (1H, J=12,5,1α-H), 6.00 (1H, J=11,9,6, 11β-H), 4.61 (1H, J=4, 6-H).

EXAMPLE 5

Incubation of 5α-pregnane-3,20-dione with *A. ochraceus*

5α-pregnane-3,20-dione (3.92 g.) in DMSO (1470 ml.) was incubated with *A. ochraceus*. Extraction after 6 days gave a brown oil which was chromatographed on an alumina column (300 g., 10% deactivated). Elution with chloroform afforded an oil which was not amenable to further purification and was acetylated in pyridine-acetic anhydride (4:1, 65 ml.) for two days in the usual way. The extract was chromatographed [one metre plate developed ×3 with petrol-acetone (6:1)], and three bands were removed. The middle band afforded 11α-acetoxy-5α-pregn-1-ene-3,20-dione (100 mg. 2.5%, 3%) which was recrystallised as needles from acetone-hexane, M.P. 148–151°, $[\alpha]_D^{20}+85°$ (c. 0.3), $\bar{v}_{max.}$ 1742, 1710, 1680, and 1233 cm.$^{-1}$, n.m.r. signals at τ(CDCl$_3$) 9.25 (3H, 18-H), 8.93 (3H, 19-H), 7.87 (6H, acetate methyl and 21-H), 4.71 (1H, J=10,10,5, 11β-H), 4.18 (1H, (J=11,2-H), 2.48 (1H, J=11, 1-H), (M [mass spectrum], 372. $C_{23}H_{32}O_4$ requires M, 372). The most polar band gave a mixture which was further resolved by p.l.c. [one metre plate developed ×15 with petrol-acetone (8:1)]. One band removed afforded 11α-hydroxy-5α-pregn-1-ene-3,20-dione (140 mg., 3%, 4%), M.P. and mixed M.P. 199–203°, $[\alpha]_D^{20}+82°$ (c. 1.0), $\bar{v}_{max.}$ 3395, 1705 and 1680 cm.$^{-1}$, λ$_{max.}$ 230 nm. (ε 11,300), n.m.r. signals at τ(CDCl$_3$) 9.31 (3H, 18-H), 8.86 (3H, 19-H), 7.86 (3H, 21-H), 5.88 (1H, J=10,10,5, 11β-H) [with D$_2$O, 5.90 (1H, J=10,10,5, 11β-H)], 4.18 (1H, J=11, 2-H), 1.64 (1H, J=11, 1-H).

Further elution of the alumina column with chloroformmethanol (20:1) gave a brown solid which was also acetylated in the usual manner with pyridine-acetic anhydride (4:1, 40 ml.). The extract was resolved by p.l.c. [One metre plate developed×3 with petrol-acetone (6:1)] into two white solids, the less polar being a mixture (300 mg.) of 1β,3β-diacetoxy-11α-hydroxy-5α-pregnan-20-one (100 mg., 2%, 3%) and 3β,11α-diacetoxy-β-hydroxy-5α-pregnan-20-one (200 mg., 4%, 5%). N.m.r. signals (minor component) at τ(CDCl$_3$) 9.41 (3H, 18-H), 8.86 (3H, 19-H), 8.0 (acetate methyls), 7.88 (3H, 21-H), 6.15 (1H, J=10,10,6, 11β-H), 5.31 (1H, J=10,10,5,5 3α-H), 5.19 (1H, J=12,5, 1α-H) and (major component) at τ(CDCl$_3$) 9.38 (3H, 18-H), 9.09 (3H, 19-H), 8.0 (acetate methyls), 7.88 (3H, 21-H), 6.38 (1H, J=12,5 1α-H), 5.31 (1H, J=10,10,5,5, 3α-H), 4.92 (1H, J=10,10,6, 1β-H).

EXAMPLE 6

Hydroxylation of a number of pregnane derivatives by *A. ochraceus* and *A. nidulans*

A number of pregnane derivatives were hydroxylated in the manner described in Example 1 (small scale-two flasks per experiment) by several strains of *A. ochraceus* and *A. nidulans*. The extract after examination by t.l.c., was taken up in acetone (3–5 ml.). 2 N-hydrochloric acid (3 to 4 drops) was added and the solution refluxed for 15 mins. The product was examined by t.l.c. and the results are tabulated below:

(b) 3β-hydroxy-1β,11α-isopropylidenedioxy-5α-pregnan-20-one

1β,3β,11α-trihydroxy-5α-pregnan-20-one (1 g.) was dissolved in acetone (100 ml.) and perchloric acid (60% w./v.; 0.02 ml. in acetone (10 ml.) was added; the reaction was allowed to stand at room temperature for 25

TABLE 1

| | Substrate | Organism | Acetonide of corresponding 1β, 11α-dihydroxy derivative |
|---|---|---|---|
| 1 | 3β-hydroxy-16α,17α-epoxy-5α-pregnan-20-one. | *Aspergillus ochraceus* Wilhelm | Formed completely 40 mg.* |
| 2 | 3β-acetoxy-5α-pregnan-20-one | do | Acetonide of 3β-hydroxy derivative formed completely 45 mg.* |
| 3 | 3β-hydroxy-5α-pregn-16-en-20-one | do | Formed completely 25 mg.* |
| 4 | 3β-hydroxy-16α-methyl-5α-pregnan-20-one | do | Formed completely 25 mg. after 30 mins.* |
| 5 | 3β-hydroxy-5α-pregnan-20-one | do | Fromed completely. |
| 6 | do | *Aspergillus ochraceus* NRRL 398 | Some evicende of acetonide formation. |
| 7 | do | *Aspergillus ochraceus* IMI 16264 | Dohydroxy derivative formed an acetonide. |
| 8 | do | *Aspergillus ochraceus* NRRL 405 | Forms acetonide. |
| 9 | do | *Aspergillus nidulans* ATCC 11267 | Do. |
| 10 | 20,20-ethylenedioxy-5α-pregnan-3β-ol | *Aspergillus ochraceus* Wilhelm | Acetonide of the 20-oxo derivative formed. |

*The compound was isolated (amount indicated) and it structure determined by n.m.r. as shown in the following table.

TABLE 2

| | Acetonide 1 | Acetonide 2 | Acetonide 3 | Acetonide 4 |
|---|---|---|---|---|
| N.m.r. (CDCl$_3$): | | | | |
| 18-$\underline{H}$ | 8.99 (9.00*) | 9.39 (9.40*) | 9.11 (9.12*) | 9.04 (9.06*). |
| 19.$\underline{H}$ | 9.11 (9.11*) | 9.12 (9.13*) | 9.08 (9.08*) | 9.14 (9.13*). |
| Acetonide | 8.72 | 8.68 | 8.71 | 8.71. |
| Methyls | 8.69 | 8.68 | 8.67 | 8.71. |
| 21-$\underline{H}$ | 7.98 | 7.89 | 7.77 | 7.86. |
| 1α-$\underline{H}$ | 6.46 J=12, 5 | 6.42 J=12, 5 | 6.44 J=12, 5 | 6.44 J=12, 5. |
| 3α-$\underline{H}$ | 6.37 J=10, 10, 5, 5 | 6.37 J=10, 10, 5, 5 | ~6.4 multiplet | 6.35 J=10, 10, 5, 5. |
| 11β-$\underline{H}$ | 6.02 J=11, 10, 6 | 6.07 J=11, 10, 6 | 5.97 J=10, 10, 6 | 6.06 J=10, 10, 6. |
| Other signals | 6.37 (16-$\underline{H}$) | | 3.33 (16-$\underline{H}$) | 8.95 J=7 (16-Me). |
| I.r. | 3650 and 1710 cm.$l^{-1}$ | 3050 and 1710 cm.$l^{-1}$ | 3650 and 1673 cm.$l^{-1}$ | 3650 and 1706 cm.$l^{-1}$. |

*Calculated values.

EXAMPLE 7

1β,11α-dihydroxylation of 3β-hydroxy-5α-pregnan-20-one with *Corticium praticola* (CBS 340.51) and *Polystictus sanguineus* (CBS 358.63)

The procedure employed was identical to that used in Example 1 in respect of *A. ochraceus* except that the respective organisms were cultured for 7 days prior to the oxidation.

Pregnanolone (40 mg.) in DMSO (15 ml.) was added to each flask of organism grown to maturity (7 days) in 200 ml. nutrient medium. After five days the contents of the flasks were extracted with chloroform, and the extract washed twice with brine to remove DMSO. The product was examined by t.l.c. before being dissolved in acetone (1 ml.) and heated to boiling for 15 min. on a water bath with four drops of 2 N -hydrochloric acid. This solution was re-examined by t.l.c. for the formation of the 1β,11α-acetonide.

In both cases acetonide formation was observed.

EXAMPLE 8

(a) 1β,3β,11α-trihydroxy-5α-pregnan-20-one

3β-hydroxy-5α-pregnan-20-one (10 g.) was fed to *A. ochraceus* in the manner described in Example 1. After incubation for 6 days at 25° with swirling at 200 r.p.m. the mycelium was filtered off, washed with water and the filtrates were combined (~47 l.); 35 l. of filtrate were extracted with ethyl acetate 3×15 l.), dried (MgSO$_4$) and evaporated under reduced pressure at 60° to ca. 3 l. This was then concentrated to ca. 100 ml., followed by distillation at 140° at 0.1 mm. pressure. Chromatography on neutral alumina using chloroform-petroleum ether (B.P. 40–60°) and chloroform as solvents followed by crystallisation from methyl acetate-petroleum ether (B.P. 40–60°) gave the title compound (3.91 g.), M.P. 215–219°, [α]$_D$+55° (c. 0.5 MeOH), n.m.r. signals at τ(CDCl$_3$) 9.40 (3H, 18-$\underline{H}$), 9.09 (3H, 19-$\underline{H}$), 7.84 (3H, 21-$\underline{H}$), min.; poured into sodium bicarbonate solution and the steroid extracted with ether. Trituration with ether gave the title compound (1.12 g.), M.P. 166–167°.

(c) 1β,11α-(1'-ethyl-1'-methylmethylenedioxy)-3β-hydroxy-5α-pregnan-20-one

1β,3β,11α-trihydroxy-5α-pregnan-20-one (100 mg.) was dissolved in methyl ethyl ketone (10 ml.) and perchloric acid (60% w./v.; 0.01 ml.) in methyl ethyl ketone (1 ml.) was added; the reaction was allowed to stand at room temperature for 60 min., poured into aqueous sodium bicarbonate and extracted with ether to give the title compound as a mixture of the two diastereoisomers (110 mg.), n.m.r. signals at τ(CDCl$_3$) 9.38, 9.41 (3H, 18-$\underline{H}$), 9.11, 9.14 (3H, 19-$\underline{H}$), 7.87, 7.90 (3H, 21-$\underline{H}$), 8.79 (Ketonide CH$_3$) 9.10 (Ketonide CH$_2$CH$_3$), 6.34 (J=12,6, 1H, 1α-$\underline{H}$), 6.4 multiplet (1H, 3α-$\underline{H}$), 6.07 (1H, 11β-$\underline{H}$).

EXAMPLE 9

11α-hydroxy-5α-pregn-1-ene-3,20-dione (a) 1β,3β,11α-trihydroxy-5α-pregnan-20-one (250 mg.) was dissolved in dioxan (50 ml.), triethylorthoacetate (1 ml.) and toluene-p-sulphonic acid (240 mg.) in chloroform (0.2 ml.) were added. The reaction was allowed to stand at room temperature for 14 min., it was then poured into aqueous sodium bicarbonate and extracted with ether. Thick layer chromatography on silica gel using 2.5% isopropyl alcohol in chloroform as solvent gave 1β,11α-(1'-ethoxy - 1' - methylmethylenedioxy)-3β-hydroxy-5α-pregnan-20-one (160 mg.), n.m.r. signals at τ(CDCl$_3$) 9.44 (3H, 18-$\underline{H}$), 9.09, 9.13 (3H, 19-$\underline{H}$), 7.89 (3H, 21-$\underline{H}$), 5.8–6.75 (1α-$\underline{H}$, 3α$\underline{H}$, 11β-$\underline{H}$), 6.47, 8.79 (ethoxymethylenedioxy), 8.56 (methylmethylenedioxy), as two diastereisomers and 3β-acetoxy - 1β,11α - (1'-ethoxy-1'-methylmethylenedioxy)-5α-pregnan-20-one (50 mg.), n.m.r. signals at τ(CDCl$_3$) 9.44 (3H, 18-$\underline{H}$), 9.09, 9.13 (3H, 19-$\underline{H}$), 7.90 (3H, 21-$\underline{H}$), 6.6 (1H, 1α-$\underline{H}$), 5.3 (1H, 3α-$\underline{H}$), 6.0 (1H, 11β-$\underline{H}$), 6.49, 8.80 (ethoxymethylenedioxy), 8.60 (methylmethylenedioxy), 8.00 (3β—CH₃COO—), also a mixture of two diastereoisomers.

The mixture of 3β-ols (100 mg.) was dissolved in pyridine (1 ml.) and added to a stirred solution of chromium trioxide (150 mg.) in pyridine (2 ml.). The reaction was stirred for 22 hours at room temperature, poured into water and the steroid extracted with ether to give 1β,11α-(1′-ethoxy-1′-methylmethylenedioxy)-5α-pregnane-3,20-dione. The total crude product was dissolved in dioxan (16 ml.) and 2 N hydrochloric acid (4 ml.) was added, the reaction was refluxed for 3 hours, cooled and poured into aqueous sodium bicarbonate and the steroid extracted with ether (65 mg.), $\lambda_{max}$. (EtOH) 231 nm. Crystallisation from methyl acetate-petroleum ether (B.P. 40–60°) gave the title compound (30 mg.), M.P. 190–192°, $\lambda_{max}$. (EtOH) 231 nm.

(b) 1β,11α - Isopropylidenedioxy - 5α - pregnane-3,20-dione (100 mg.) was dissolved in methanol (10 ml.) and perchloric acid (0.75 ml. 60% w./v.) was added; the reaction was allowed to stand at room temperature for 17 hours, and it was then poured into sodium bicarbonate solution and the steroid extracted with chloroform. Crystallisation from methyl acetate-petroleum ether (B.P. 40–60°) gave the title compound (50 mg.), M.P. 199–201°, $\lambda_{max}$. (EtOH) 229.5 nm. (ε 10,990).

EXAMPLE 10

1β,11α-isopropylidenedioxy-5α-pregnane-3,20-dione

Chromium trioxide (600 mg.) was added to pyridine (6 ml.) and the reaction stirred for ca. 15 mins., 3β-hydroxy - 1β,11α - isopropylidenedioxy - 5α-pregnan-20-one (560 mg.) dissolved in pyridine (4 ml.) was added and the reaction stirred at room temperature for 20 hours, poured into water and the steroid extracted with ether. The extract was washed with 2 N hydrochloric acid, aqueous sodium bicarbonate and water, dried (MgSO₄) and evaporated. Crystallisation from acetone-hexane gave the title compound (360 mg.), M.P. 182–184°.

EXAMPLE 11

1β,11α-isopropylidenedioxypregn-4-ene-3,20-dione

1β,11α - isopropylidenedioxy - 5α-pregnane-3,20-dione (261 mg.) was dissolved in dioxan (9.5 ml.) and added to bromine (40 mg.) together with one drop HBr/acetic acid (45%). The reaction was allowed to stand at room temperature for 2 hours. It was then poured into aqueous sodium bicarbonate and the steroid extracted with ether to give a crude bromo-compound.

The crude product was dissolved in dimethyl acetamide (100 ml.) and calcium carbonate (600 mg.) was added; the reaction was stirred and refluxed for 1 hour. It was then cooled and poured into 2 N hydrochloric acid and the steroid extracted with chloroform (220 mg.). The product was chromatographed on silica gel plates using chloroform as solvent and the U.V. absorbing material eluted with methanol (83 mg.). Further chromatography using acetone-petroleum ether (B.P. 40–60°) as solvent separated this material into two components, the minor component (18 mg.) was found to be 1β,11α-isopropylidenedioxypregna - 4,16 - diene - 3,20-dione $\lambda_{max}$. (EtOH) 238 nm., n.m.r. signals at τ(CDCl₃) 9.07 (3H, 18-$\underline{H}$), 8.64 (3H, 19-$\underline{H}$), 7.74 (3H, 21-$\underline{H}$), 3.18 (1H, 1α-$\underline{H}$), 4.21 (1H, 4-$\underline{H}$), 5.82 (1H, 11β-$\underline{H}$), 5.94 (1H, 16-$\underline{H}$), 8.74 (acetonide-CH₃). The major component (37 mg.) was crystallised from methyl acetate-petroleum ether (B.P. 40–60°) to give 1β,11α-isopropylidenedioxypregn-4-ene-3,20-dione (20 mg.), M.P. 196–198°, $\lambda_{max}$. (EtOH) 238.5 nm. (Found: C, 72.9; H, 8.75. $C_{24}H_{34}O_4 \cdot \frac{1}{2}H_2O$ requires C, 73.0; H, 8.8%.)

EXAMPLE 12

11α-hydroxypregna-1,4-diene-3,20-dione

The crude bromination product prepared as described in Example 11 from 1β,11α-isopropylidenedioxy-5α-pregnane-3,20-dione (252 mg.) was dissolved in dimethylacetamide (50 ml.) and refluxed with calcium carbonate (600 mg.) with stirring for 1 hour. The reaction was poured into cold 2 N hydrochloric acid and steroid extracted with chloroform (230 mg.). The crude product (220 mg.) was dissolved in methanol (20 ml.) and perchloric acid (1.5 ml.; 60% w./v.) was added. The reaction was allowed to stand at room temperature for 17 hours, poured into aqueous sodium bicarbonate and extracted with chloroform. Chromatography on silica plates using ethyl acetate as solvent, after four runs and elution with methanol, gave the title compound (40 mg.), overall yield 19%, M.P. 215–218°, $\lambda_{max}$. (EtOH) 247.5 nm.

We claim:

1. A process for the microbiological 1β,11α-bis-hydroxylation of ring A- and C-saturated 5α- and 5(6)-dehydropregnan-20-ones possessing at the 16- and 17α-positions hydrogen atoms or one only of the following groupings, namely a 17α-hydroxy group, a 17α-acyloxy group, a 16-aliphatic group, a 16,17-epoxy group or a 16,17-double bond, which comprises incubating the steroid substrate with one of the microorganisms *Aspergillus ochraceus*, *Aspergillus nidulans*, *Rhizopus arrhizus*, *Corticium praticola* or *Polystictus sanguineus* and isolating said bis-hydroxylated product.

2. A process according to claim 1 wherein the steroid substrate carries a hydroxy group, an esterified hydroxy group or a keto group in the 3-position.

3. A process according to claim 1 wherein the 16-aliphatic group is a methyl group in the β-configuration.

4. A process according to claim 1 wherein a dialkyl sulphoxide, an alkanol, a substituted amide, a ketone or an ether is added to the culture medium as a solvent for the steroid substrate.

5. A process according to claim 4 wherein the solvent is dimethyl sulphoxide.

6. A process according to claim 4 wherein the concentration of the solvent in the culture medium is 0.1–10% by volume.

7. A process according to claim 1 wherein a wetting agent is added to the culture medium.

8. A process according to claim 7 wherein a polyoxyethylene ether of a hexitol anhydride long-chain fatty acid ester having about 20 oxyethylene units per molecule or an alkyl benzene sodium sulphonate is used as wetting agent.

9. A process according to claim 1 wherein the concentration of steroid substrate in the culture medium is 0.01–5% by weight.

10. A process according to claim 1 in which the microbiological hydroxylation is effected for ½–8 days.

11. A process according to claim 1 wherein the microorganism used is *A. ochraceus* of strain Wilhelm (CBS 132.52), NRRL 398, IMI 16264 or NRRI 405, or *A. nidulans* of strain ATCC 11267, or *R. arrhizus* of strain CBS 285.55.

12. A process according to claim 1 wherein the recovery of the bis-hydroxylated product includes the step of forming an alkylenedioxy derivative by reacting the product with a ketone or aldehyde, or forming an orthoester by reacting the product with an orthoester reagent.

13. A process according to claim 12 wherein the alkylenedioxy derivative formed is an acetonide.

14. A process according to claim 12 wherein the alkylenedioxy derivative or orthoester derivative is subsequently hydrolysed to remove the alkylenedioxy or orthoester grouping.

15. A process according to claim 14 wherein the hydrolysis is effected in dilute mineral acid.

16. A process according to claim 1 wherein the bis-hydroxylated product is esterified on recovery by reaction with an acylating agent.

17. A process according to claim 1 wherein the bis-hydroxylated product is a 1β,11α-dihydroxy-3-keto steroid

13 which is subsequently dehydrated to the corresponding 1,2-dehydro compound.

18. A process according to claim 12 wherein an alkylenedioxy, orthoester or ester derivative of a 3β-hydroxy-steroid is formed and is subsequently oxidised to the corresponding 3-oxo compound.

19. A process according to claim 1 wherein a 1β,3β,11α-trihydroxy steroid is initially formed and is oxidised with chromic acid in the presence of a ketone whereby a 1β,11α-alkylenedioxy-3-ketone is produced.

20. A process according to claim 12 in which a 3-keto-1β,11α-alkylenedioxy or orthoester derivative is subjected to acidic hydrolysis to yield the corresponding 3-keto-11α-hydroxy-1(2)-dehydro steroid.

21. A process according to claim 12 wherein a 3-keto-1β,11α-alkylenedioxy or orthoester derivative is formed and is subsequently brominated to introduce a ring-A bromine atom and this compound is dehydrobrominated to introduce a 4,5-double bond.

22. A process according to claim 21 wherein the bromination also introduces a 17-bromine atom, whereby a 16,17-double bond is introduced on dehydrobromination.

23. A process according to claim 21 in which the 3-keto-4(5)-dehydro-alkylenedioxy or orthoester derivative

14 is subjected to acid hydrolysis to yield the corresponding 3-keto-11α-hydroxy-$\Delta^{1,4}$-derivative.

24. A process according to claim 1 wherein the steroid substrate is incubated with one of the microorganisms *Corticium praticola* or *Polystictus sanguineus*.

25. A process according to claim 24 wherein the microorganism used is *C. praticola Kotila* of strain CBS 340.51 or *P. sanguineus* (L. ex Fr.) Mey [*Pycnoporcus sanguineus* (L. ex Fr.) Murrill] of strain CBS 358.63.

26. A process according to claim 1 wherein the steroid substrate is reacted in the form of a 20 - carbonyl derivative.

27. A process according to claim 26 wherein the steroid substrate is reacted as a 20-ketal.

References Cited

UNITED STATES PATENTS 3,294,646   12/1966   Smith et al. _____ 195—51 R

ALVIN E. TANENHOLTZ, Primary Examiner

U.S. Cl. X.R.

195—51 A; 260—239.55